United States Patent [19]

Müller

[11] 3,910,333

[45] Oct. 7, 1975

[54] LINK CONNECTION FOR TIRE CHAINS
[75] Inventor: Anton Müller, Unterkochen, Germany
[73] Assignee: Eisen- und Drahtwerk Erlau Aktiengesellschaft, Aalen, Germany
[22] Filed: Sept. 3, 1974
[21] Appl. No.: 502,629

[30] Foreign Application Priority Data
Sept. 1, 1973  Germany............................ 2344232

[52] U.S. Cl. ................ 152/243; 152/171; 152/239; 59/93
[51] Int. Cl.² .......................................... B60C 27/00
[58] Field of Search .......... 152/171, 232, 233, 239, 152/242, 243, 244, 245; 59/90, 93

[56] References Cited
UNITED STATES PATENTS

| | | | |
|---|---|---|---|
| 1,461,378 | 7/1923 | Borst, Jr. ............................ | 152/239 |
| 3,429,353 | 2/1969 | Schürle et al. ...................... | 152/243 |
| 3,630,256 | 12/1971 | Siepmann et al. ................... | 152/243 |
| 3,709,275 | 1/1973 | Müller ................................. | 152/243 |
| 3,744,239 | 7/1973 | l'Anson .............................. | 152/244 |
| 3,783,923 | 1/1974 | Dohmeier ........................... | 152/243 |

Primary Examiner—Drayton E. Hoffman
Attorney, Agent, or Firm—Walter Becker

[57]  ABSTRACT

A link connection for tire chains with at least two links engaging each other. One of said links is designed as a web link having two engaging openings for the connecting links which engaging openings are located opposite to each other in the longitudinal direction of said link. The two engaging openings are set back relative to the end edges of the first mentioned link and are formed by at least one receiving opening extending through the link body. The other one of said two links forms a connecting link which is approximately annular and has engaging sections which are located opposite to each other and are adapted to engage engaging openings of web links. The link connection is characterized primarily in that the ratio of the cross-sectional width of the engaging section, with the cross-sectional width, measured in the direction of the connecting line between the two engaging sections, to the inner distance between the engaging sections and the distance between the engaging openings of the web link is approximately 1:4:4 with a maximum deviation of the two distances in the magnitude of ±2/10 of the cross-sectional width of the engaging section.

16 Claims, 3 Drawing Figures

U.S. Patent    Oct. 7,1975    3,910,333
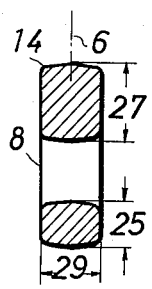
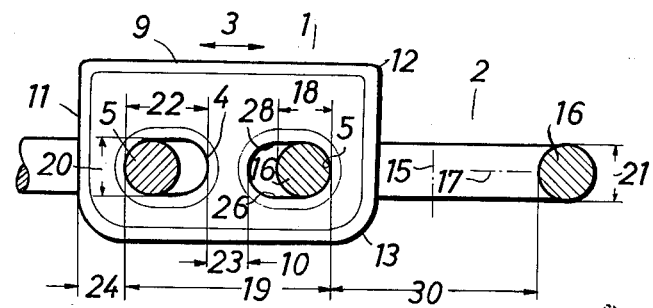
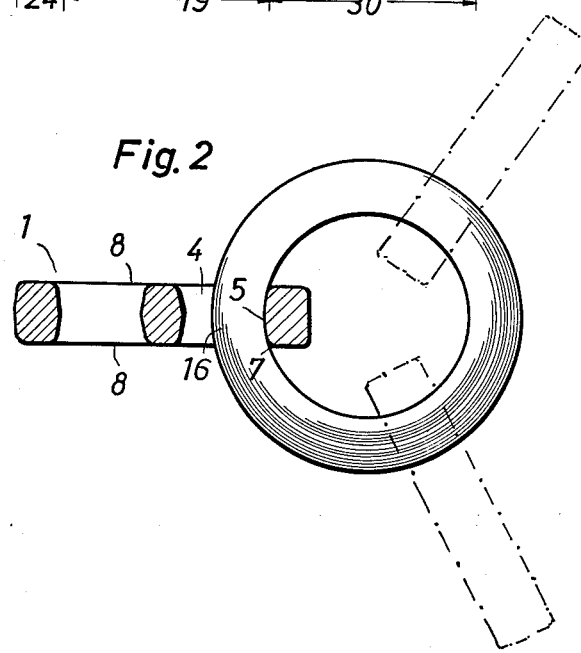

LINK CONNECTION FOR TIRE CHAINS

The present invention relates to a link connection for tire chains with at least two interengaging links of which one is designed as a web link which comprises two engaging openings for connecting links while the other one of said interengaging links represents a connecting link that has an approximately annular shape and comprises engaging sections located opposite to each other for the engagement of web links in engaging openings. The said engaging openings for connecting links are located opposite to each other in the longitudinal direction of the web link and are set back relative to the end edges of said web link. The said engaging openings are formed by at least one opening extending through the link body of said web link.

Experience has shown that with tire chains built up in conformity with the web-link-principle, definite dimensional relationships furnish the best effect with regard to tire protection and with regard to the self-cleaning effect of the tire chain as well as with regard to the saving of the tire chain and the inner movability of the tire chain. If the cross-sectional width of the connecting link is rather great, it is necessary already for manufacturing reasons that a certain minimum inner width of the connecting link be maintained. Furthermore, the distance between the individual engaging openings with regard to the cross-sectional width of the connecting link must not be exceeded because otherwise the connecting link will have the tendency easily to break.

It is, therefore, an object of the present invention so to design a link connection of the above mentioned type that the above outlined advantages will be realized while the above described drawbacks will be avoided.

These and other objects and advantages of the invention will appear more clearly from the following specification, in connection with the accompanying drawing, in which:

FIG. 1 shows a link connection according to the invention, partially in view and partially in section.

FIG. 2 is a partially sectioned top view of two links of the link connection of FIG. 1.

FIG. 3 shows a vertical section through the web link according to FIG. 1.

The above outlined objects have been realized by a link connection according to the present invention which is characterized primarily in that the ratio of the cross-sectional width of the engaging section, measured between the two engaging sections, to the inner distance between the engaging sections and with regard to the distance between the engaging openings of the web link amounts to approximately 1:4:4 with a maximum deviation of the two distances in the magnitude of ± 2/10 of the cross-sectional width of the engaging section. In this way, a very narrow mesh construction of the link connection is obtained which on one hand, like an armor, covers the tire, and on the other hand, nevertheless, is flexible and stabile.

The connecting link is expediently annular so that it laterally projects beyond the web link further than a flat oval annular link and thus assures a still better armor. Furthermore, according to the present invention, it is possible that the connecting link turns about its central axis relative to the web link and thus will be uniformly worn. This is the case in particular when the connecting link over its entire circumference comprises uniform cross sections so that every circumferential section of the connecting link is able to form an engagement section.

For purposes of obtaining a still easier movability of the connecting link relative to the web link and also for the purpose of reducing the wear, the inner surface of the engaging section, which inner surface is directed toward the center of the connecting link, is in cross section rounded in the form of a partial circle. This can be realized, for instance, by a circular cross-sectional design of the engagement section.

For purposes of obtaining a particularly high stability of the web link within the region of the receiving opening, and in order to avoid a knocking of the connecting link in the receiving opening, at least to a major extent, the maximum cross-sectional width of the engaging section, as measured transverse to the connecting line between the connecting sections, is at least by one-tenth, preferably at a maximum by two-tenths smaller than the corresponding width of the receiving opening within the region of the engaging opening. In this way, a very favorable movability of the two links relative to each other will be realized.

The two links engage each other with still lower specific surface pressures when the engaging opening in side view, preferably by an oblong-shaped design of the receiving opening is in a concave manner, especially semicircular rounded with a diameter corresponding to the width of the receiving opening. This advantage can also be realized when the engaging opening in cross section is convexly curved in conformity with the radius of curvature of the engaging section and preferably through more curved lateral zones merges with the lateral surfaces of the link body.

When the distance of that confinement of the receiving opening which faces the tire side of the web link from the tire side is less, preferably by two-tenths than the width of the receiving opening, on one hand a sufficient cross-sectional thickness of the web link is obtained within the region of the tire side and on the other hand, a relatively close position of the connecting link at the tire surface is obtained so that the connecting link is well protected against wear by the road and itself forms a still better protection for the tire while the connecting link is located sufficiently close to the tire surface in order that soil collecting at the tire surface will be detached by its relative movements.

A distance favorable for saving the connecting link from the road is also obtained when the distance of the confinement of the receiving opening, which confinement faces the running surface of the web link, from the running surface of the new web link not yet worn by wear is greater, preferably by three-tenths than the width of the receiving opening whereby also a relatively high wear volume is obtained. The described distances of the receiving opening assure a very favorable tilting behavior of the web link when the latter is under the load of the axle of the vehicle.

With two receiving openings arranged one behind the other, the length of said openings is expediently greater than its width by approximately four-tenths and/or is twice as great as the distance between said receiving openings so that the interengaging links will be able in the direction of their connecting line slightly to move relative to each other so that when the tire deforms the interengaging links will not have to lift themselves off from the tire under all circumstances, because the tire chain will be able due to this design to shrink and expand within predetermined limits.

A further improvement of the protection of the tire as well as of the behavior of the two links relative to their flexibility can be realized by making the distance between the engaging opening and the adjacent end edge of the web link smaller than its width, preferably two-tenths of said width and/or one-tenth of the cross-sectional width of the engaging section so that the web link projects only by about one-fourth of the inner width of the connecting link in the link opening of said connecting link.

A favorable tilting behavior of the web link relative to the connecting link can be realized when the thickness of the web link within the region of the interengaging opening approximately equals the width of said engaging opening and preferably is slightly less, for instance, by one-third so that the engaging opening extends correspondingly in the direction in which it extends through the link body.

The link connection expediently forms a central net of a tire chain of web and connecting links. According to the invention, at least three, especially four web links offset with regard to each other and, for instance, uniformly distributed about the central axis of the connecting link engage engagement sections of each connecting link, so that the above described effects will be realized to an even further improved extent. The design according to the invention is suitable, for instance, for web links with which the distance of the engaging openings from each other amounts to 35 mm and the web height with 30 mm amounts to about one-seventh less, and for connecting links with which the cross-sectional width amounts to 9 mm and the inner diameter amounts to 35 mm.

Referring now to the drawing in detail, the link connection illustrated in FIGS. 1 – 3 comprises a web link 1 and two connecting links 2 which engage the receiving openings of said web link 1. These links 2 which may be formed, for instance, of rod-shaped material, may be designed as butt-welded annular links. The web link 1 is designed, for instance, as a drop-forged link.

The web link 1 comprises two equal receiving openings 4 which, when viewing in the longitudinal direction indicated by the arrow 3, are located one behind the other and extend through the link body of the web link 1. The receiving openings 4 are flat oval in the longitudinal direction indicated by the arrow 3 of the web link 1 in side view according to FIG. 1, and in this longitudinal direction (arrow 3) are in alignment with each other. These receiving openings 4 form with those zones thereof which are farthest spaced from each other and which are located opposite to each other respectively an engaging opening 5 for a connecting link 2. The engaging openings 5 are concavely rounded about axes which are located at a right angle to the longitudinal central plane 6 of the web link 1 and are arranged symmetrically with regard to a plane which is parallel to the longitudinal direction indicated by the arrow 3 and is at a right angle to the longitudinal central plane 6. The inner surfaces of the engaging openings 5 are in section according to FIG. 2 convexly rounded in conformity with the inner diameter of the connecting link 2 and merge through more curved sections 7 laterally with the side surfaces 8 of the web link 1, which sections 7 with the illustrated embodiment approximately over the entire extension of said embodiment are located parallel to each other. The cross-sectional design according to FIG. 1 may be provided over the entire circumference of the receiving openings 4. The web link 1 forms with its longitudinal edge 9 a running surface and with the longitudinal edge which faces away therefrom and is parallel thereto forms a tire engaging surface 10. These edges 9, 10 are interconnected by end edges 11 which are located at a right angle to said edges 9, 10. The end edges 11 are through small corner zones 12 which are rounded over a quarter of a circle merged with the running surface 9 and through corner zones 13 which are rounded with a considerably greater radius merge with the tire engaging surface 10 while the radius of curvature of corner zones 13 is greater than that of the engaging openings 5. The side surfaces 8 of the web link 1 likewise merge through rounded corner edge zones 14 which are rounded over a quarter of a circle with the remaining surfaces of the web link. The radius of curvature of these corner edge zones 14 may be approximately equal to the radius of curvature of the corner zones 12 and may, for instance, be 1.5 mm or amount to a measurement which is approximately 1.5/10 of the thickness of the web link.

The connecting link 2 which is circularly curved about its central axis 15 forms with the respective section engaging the engaging opening 5 an engagement section 16 while it expediently forms a plurality of engaging sections for web links, which engaging sections are uniformly distributed over the circumference. These engaging sections 16 are similar to the remaining connecting link 2 of a circular cross section.

The cross-sectional width 18 of the connecting link 2, which cross-sectional width is measured parallel to the connecting line 17 of oppositely engaging engagement sections 16 amounts to one-fourth of the distance 19 between the two engaging openings 15. The cross-sectional width 18 of the connecting link 2 is with the illustrated embodiment equal to the wire diameter of said connecting link 2. The two engaging openings 5 have a width 20 measured at a right angle to said distance, which width is only very slightly greater than the corresponding width 21 of the engaging section 16. The width 20 equals the diameter of curvature of the engaging opening 5, and the width 20 of the illustrated embodiment equals the wire diameter of the connecting link 2. The length 22 of the respective receiving opening 4 is approximately twice as great as the distance 23 of those zones of the receiving openings 4 which are closest to each other and are rounded in a semicircular manner. The distance 24 of the engaging openings 5 from the respective pertaining end edge 11 is slightly greater, namely, approximately between one-tenth and two-tenths greater than the distance 23. The distance 24 of the confinement 26 facing the tire engaging surface 10 and pertaining to the respective receiving opening 4 of the tire engaging surface 10 is less than the width 20 of the receiving opening 4. The distance 27 between the oppositely located confinement 28 and running surface 9 is greater relative to the width 20. The thickness 29 of the web link 1 is first within the region of the engaging openings 5 approximately equal the width 20 of said engaging openings. Finally, the inner distance 30 between engaging surface 16 of the connecting link 2 which are located opposite to each other, which distance 30 equals the inner diameter of said connecting link 2, equals the distance 19 between the engaging openings 5, in other words equals four times the cross-sectional width 18. Experience has shown that tire chains, for instance, with a rhomboidal net structure, have an excellent running behavior due to the described design while being easily manufactured and while excelling by a long life span and a maximum tire protection.

It is, of course, to be understood that the present invention is, by no means, limited to the specific showing in the drawing, but also comprises any modifications within the scope of the appended claims.

What I claim is:

1. A link connection for tire chains which includes at least one web link having a link body with two oppositely located end edges and with two engaging openings extending through said link body, said openings being located in the longitudinal direction of said link body opposite to each other while being set back relative to said end edges of said link body, at least one annular connecting link having engaging sections located opposite each other with one of said engaging sections in engagement with a wall defining one of said two engaging openings, the ratio of the cross-sectional width measured in the direction of the straight connecting line between said two engaging sections to the inner distance of said engaging sections and to the distance between said engaging openings of said web link approximately equaling 1:4:4 with a maximum deviation of said two distances in the magnitude of ± 2/10 of the cross-sectional width of the respective adjacent engaging section.

2. A link connection according to claim 1, in which said connecting link is annular and symmetrical to its central plane and over its entire circumference has evenly rounded cross sections.

3. A link connection according to claim 2, in which that inner surface of the engaging section adjacent said connecting link which is directed toward the center of said connecting link forms a part of a circle when seen in cross section.

4. A link connection according to claim 3, in which said engaging section has a circular cross-sectional contour for engagement with said connecting link.

5. A link connection according to claim 1, in which said engaging openings form a part of respective receiving openings provided in said web link, and in which the maximum cross-sectional width of said engaging sections measured transverse to the shortest connecting line between said engaging sections is at least by one-tenth and at the maximum by two-tenths less than the corresponding width of said receiving opening within the region of the pertaining engaging opening.

6. A link connection according to claim 5, in which said receiving opening has an oblong design, and in which the wall defining said engaging opening in side view is concavely rounded with a diameter corresponding to the width of the receiving opening, the wall defining said engaging opening in cross section being convexly curved corresponding to the radius of curvature of that portion of said connecting link which engages said engaging opening, and merging with the side surfaces of said link body.

7. A link connection according to claim 5, in which the wall defining said engaging opening is semicircularly rounded.

8. A link connection according to claim 5, in which said link body has a longitudinal tire engaging side and a longitudinal running side, and in which the distance of the inside of that wall portion which defines a portion of said receiving opening and which is adjacent said tire engaging side from said tire engaging side is less than the width of said receiving opening, whereas the distance of the inner side of that wall portion which defines a portion of said receiving opening and which is adjacent said running side from said running side is greater than the width of said receiving opening.

9. A link connection according to claim 8, in which the distance of said inside of the wall portion defining a portion of said receiving opening and adjacent the tire side, from said tire engaging side is approximately by two-tenths less than the width of said receiving opening, and in which the distance of the inner side of the wall portion defining a portion of said receiving opening and adjacent said running side, from the latter is approximately by three-tenths greater than the width of the pertaining receiving opening.

10. A link connection according to claim 5, in which said link body has two receiving openings arranged one behind the other, and each having a length approximately by four-tenths longer than its width.

11. A link connection according to claim 5, in which said link body has two receiving openings arranged one behind the other and each having a length of approximately quite the distance between said two receiving openings.

12. A link connection according to claim 1, in which the distance of each engaging opening from the respective adjacent end edge is less than the width of the respective engaging opening.

13. A link connection according to claim 1, in which the distance of each engaging opening from the respective adjacent end edge is less than two-tenths of said width.

14. A link connection according to claim 1, in which the distance of each engaging opening from the respective adjacent end edge is approximately one-tenth of the cross-sectional width of the respective pertaining engaging section.

15. A link connection according to claim 1, in which the thickness of the web link within the region of the engaging openings is approximately equaling the width of the latter.

16. A link connection according to claim 1, which forms a part of an intermediate net of a tire chain having a plurality of web links and connecting links, at least three web links offset relative to each other engaging one connecting link.

* * * * *